Patented Jan. 23, 1945

2,367,815

UNITED STATES PATENT OFFICE 2,367,815

MOTOR FUEL ADJUVANT

Norman D. Williams and William J. Backoff, Chicago, Ill., assignors to The Pure Oil Company, Chicago, Ill., a corporation of Ohio No Drawing. Application March 21, 1941, Serial No. 384,548

9 Claims. (Cl. 44—58)

This invention relates to a method of removing gum and carbonaceous deposits from mechanical parts, particularly internal combustion engines, and to novel compositions useful in connection therewith.

In the operation of internal combustion engines there is invariably formed as a result of the conditions of combustion, a deposit in the combustion chamber of the cylinders, on the piston heads, around the valves and also on the spark plugs, which materially interferes with proper and efficient operation of the motor. In the combustion zone the deposit causes what is commonly known as knocking or predetonation of the fuel charge in the cylinders. Similar deposits cause the piston rings and valves to stick. This deposit is commonly referred to as carbon, although it is not composed wholly of carbon but includes other material as mineral matter from road dust drawn into the carburetor, metallic particles, gum and rust, etc. The so-called carbon element of the deposit is largely a result of incomplete combustion of fuel and carbonization of mineral oil. The incomplete combustion of fuel not only accounts for carbon deposits but undoubtedly also accounts for a deposit of gum-like material as well, which under the prevailing conditions may be in a form ranging from a fairly soft gum to a hard, brittle varnish-like substance. For purposes of convenience, the deposits of materials in internal combustion engines, described in the foregoing paragraph, will be referred to as carbon deposits.

It has also been noted that motor fuels such as the usual gasolines now on the market, form a deposit of a gum-like residue in the intake system of internal combustion engines. This deposit is usually most noticeable in the intake manifold and around the intake valves, and is generally referred to as gum. This deposition of gum is very objectionable and may be the cause of the improper functioning, or failure to function, of the intake valves whereby the operating efficiency is materially impaired.

It is an object of this invention to provide a method for removing gum and carbonaceous deposits from mechanical parts, particularly from the intake and combustion zones of internal combustion engines.

It is another object of the invention to provide a composition capable of removing gum and carbonaceous deposits from mechanical parts, particularly the intake and combustion zones of internal combustion engines.

It is a further object of this invention to provide a composition which is adapted to be used in conjunction with gasoline or other fuels in internal combustion engines. When this gasoline-solvent fuel mixture is used in internal combustion engines, it effectively minimizes the tendency toward formation of carbon and gum deposits in both the intake system and combustion zone and in those engines where deposits of carbon and gum are already present and are interfering with efficient operation, the deposits are substantially decreased and/or removed, restoring the engine to higher operating efficiency.

Still another object of this invention is to provide a material which may be used to remove carbon and gum deposits from the intake and combustion chamber areas of internal combustion engines and from machinery in general where such deposits have a tendency to occur.

Further objects of the invention will appear from the following description.

It is known that a number of substances have been used in the past with some degree of success to remove or prevent deposits of carbon and gum in internal combustion engines. As a result of laboratory investigation and of commercial usage, it has been found that the materials disclosed in the prior art fail to effectively remove the deposits from either the intake system or the combustion zone. These materials, although possibly producing a slight improvement in engine operating conditions, are unsatisfactory for the reason that removal or prevention of carbon deposits and gum in both the intake and combustion system is not effected.

In an effort to overcome the deficiencies of the earlier carbon and gum removing agents, frequently referred to as solvents, resort has been had to those materials which have a stronger and more powerful action, such as halogenated organic compounds. The use of such materials frequently resulted in the corrosion of engine parts which, of course, was highly undesirable. The effect of simply increasing the amount of solvent additive has also been tried but this change generally results in increasing the deposit in the combustion zone, apparently as a result of carbonization of the solvent itself or as a result of the effect of the solvent action in the intake system, causing removal of the deposit there and the carrying of the deposit into the combustion zone where, due to the difference in conditions such as temperature and pressure, deposition of material resulted and the deposit in the combustion zone increased.

We have discovered that if certain compounds are injected in proper proportions into an engine in the manner hereinafter described, the gum and carbonaceous deposits which accumulate in the intake and combustion zones of internal combustion engines can be largely removed with the result that the octane requirement of the engine is considerably reduced. The efficiency of the engine is also improved to the point where it is in condition to operate with lower fuel consumption than before the injection of the aforesaid compounds. After the engine is placed in this improved condition, if the engine is run on gasoline containing our novel solvent, the ability of the engine to run with improved efficiency is maintained. While the nature of the solvent effect of the proposed combination is such as to be classed as very active under the conditions which it is used, yet the material is non-corrosive and does not injure in any way the metal parts with which it comes in contact. The materials used in preparing the solvent in accordance with this invention are (1) hydroxy benzenes including mono-, di- and tri-hydroxy benzenes and alkyl substituted hydroxy benzenes, particularly alkyl monohydroxy benzenes in which the alkyl groups contain not more than three carbon atoms; and (2) naphthalene compounds including naphthalene, alkyl substituted naphthalenes, and particularly alkyl substituted naphthalenes where the alkyl group is of low molecular weight such as methyl naphthalenes. "Naphthalene compound" as used throughout the specification and claims refers to naphthalene and alkyl derivatives thereof. As examples of the first group may be mentioned, phenol, resorcinol, thymol, pyrocatechol, pyrogallol, ethyl phenol, carvacrol, cresorcinol and cresols. Examples of the second group are naphthalene, alpha methyl naphthalene, beta methyl naphthalene and particularly commercial "methyl naphthalene" which is a mixture of alpha and beta methyl naphthalene. Particularly effective results have been obtained with compositions containing cresol and commercial methyl naphthalene.

The proportions of the various compounds indicated which may be used in such combinations of solvent materials may vary from approximately 13% to 95% by volume of group (1) to approximately 87% to 5% by volume of group (2). However, it is preferable to maintain the proportions of the materials within the limits of approximately 25% to 75% by volume of group (1) to 75% to 25% by volume of group (2). The proportions of materials which give the best results vary somewhat depending upon the specific compounds used, but all within the range set forth. It has been found that a composition composed of 50% by volume of commercial cresol and 50% by volume of commercial methyl naphthalene is very effective.

Compositions in accordance with this invention, in order to be most effective are injected into the engine to be treated when the engine is approximately at normal driving temperature. The preferred method of injecting the solvent is to remove the air cleaner from the carburetor, and while the engine is running slightly faster than when idling, approximately eight ounces of the composition is injected by means of a pressure atomizer into the throat of the carburetor. The ignition is then turned off and the spark plugs removed. Approximately eight more ounces of the composition is injected in a similar manner into the engine through the spark plug holes, the composition being approximately evenly divided among the cylinders. The spark plugs are replaced and the engine is then allowed to stand for about fifteen minutes after which it is run for a short time with throttle partially open and then accelerated intermittently until the exhaust smoke clears up. The entire treatment requires approximately one-half hour.

It has been further found that when certain proportions of compounds boiling below 350° F. having good gum solvent properties at ordinary temperature and selected from the group (3) consisting of benzene, alkyl benzenes, particularly low boiling alkyl benzenes, such as those having not more than three carbon atoms in the alkyl groups, low boiling aromatic containing liquids of petroleum origin of which naphtha sold under the trade mark "Solvesso" is an example, aliphatic alcohols, aliphatic ketones and esters of aliphatic acids, are added to the aforementioned combinations of solvent materials, greatly enhanced removal of deposits is obtained. Examples of this group of compounds include benzene, toluene, xylenes, methyl alcohol, methyl ketone, ethyl acetate and Solvesso naphthas No. 1 and 2. The esters referred to in this group are of that class of compounds that are true esters, i. e., an organic salt formed from an alcohol and an organic acid by elimination of water. Compounds of group 3 may be incorporated in the solvent compositions in amounts ranging from about 5% to 50% by volume based on the total volume of solvent composition. In employing solvent compositions containing compounds from all three groups, the proportions of the compounds from each group which may suitably be used are approximately 12% to 90% by volume of material from group (1), 5% to 78% by volume of material from group (2) and 5% to 50% by volume of material from group (3). A composition composed of 50% by volume of cresol, 35% by volume of commercial methyl naphthalene and 15% by volume of toluol has been found to be particularly effective.

In applying the aforementioned solvent compositions, particularly those compositions containing a hydroxy benzene having escharotic properties such as phenol or cresol as the group (1) material, it has been found to be exceedingly difficult to avoid skin irritations of the operators who apply the solvent compositions to the engines. This is due to the fact that in handling the solvent, it is almost impossible to completely avoid contact between the solvent and the skin of the operator's hands, arms or even face. While various precautions, such as rubber gloves and the like, might be used to improve the situation, it has been found expedient to incorporate one or more compounds from the group (4) consisting of esters of aromatic acids, particularly alkyl esters of aromatic di-carboxylic acids in amounts sufficient to prevent undesirable dermatitis reactions when the solvent comes in contact with the skin of persons applying the solvent to the particular mechanical parts from which deposits are to be removed. Examples of materials in group (4) include benzyl benzoate, dibutyl phthalate, di-methyl phthalate and amyl phthalate. The proportion of material in group (4) which is required to prevent the undesirable dermatitis effects of the composition is a function of the amount and kind of materials of group (1) and (4) employed and is ordinarily not less than approximately 50% of the volume of material from group (1) and may be as much as an amount slightly in excess of the volume of material specified from group (1) present in the compositions. In general, the amount of material of group (4) which is used within the limits specified, is the minimum required to eliminate the escharotic action of the material of group (1). However, in no case is the amount of material from group (4) to be substantially in excess of 15% by volume of the total amount of material from groups (1), (2), (3) and (4) employed, since greater amounts materially detract from the efficacy of the solvent compositions.

In order to determine the amount of ester required to bring about the desired results, a very simple test may be employed. A few drops of the composition to be tested are placed on the skin on the inner side of the wrist and allowed to remain there for about three minutes. If at the end of this time no burning or irritating sensation is noted, the composition may be said to have substantially no escharotic action. The anti-irritant added to the solvent compositions is a substance which will produce no harmful effects in the engine and is preferably a substance which at elevated temperatures has solvent properties for gum of the nature of that encountered in internal combustion engines. A particularly effective solvent composition for removing deposits and which does not cause undesirable dermatitis reactions is a composition consisting of 50% by volume of benzol, 20% by volume of cresol, 20% by volume of commercial methyl naphthalene and 10% by volume of dibutyl phthalate.

While the aforementioned solvent compositions are all particularly suited for direct application to the affected mechanical parts, for the purpose of removing gum and carbon deposits, the solvents preferably incorporated in suitable vehicles, may be used as additives for motor fuels. Suitable vehicles are those materials which have good penetrating and wetting characteristics with respect to the deposits and include hydrocarbon and non-hydrocarbon liquids which are soluble in mineral oil and motor fuels and in which the solvents are soluble. These vehicles preferably boil within the range of 350 to 850° F. Satisfactory vehicles include pine oil and refined mineral oil fractions which have a boiling range higher than that of kerosene distillate and preferably a viscosity between 70 and 500 seconds Saybolt universal at 100° F. When the solvent compositions are incorporated in motor fuel as additives, the ingredients in the solvent should be maintained within the relative proportions previously set forth, while diluting the compositions with approximately 50% and not more than 90% by volume of vehicle.

The quantity of such mixture which, when added to motor fuel, is necessary to effectively remove and/or minimize gum and carbon deposits may vary considerably depending on the type of engine, condition of engine, and particular fuel employed, and the operating conditions encountered. A maximum of 5% and usually not over 1% of solvent, based on the volume of motor fuel, is sufficient. Generally speaking, larger proportions are required when relatively large proportions of vehicle are used in the solvent compositions. In general, it has been found that from 0.1% to 0.5% of solvent gives particularly satisfactory results. The amount of solvent to be used will also vary within the limits specified with different engines and with the type of service to which the engine is subjected. It has been found by experiment that, in some cases, deviation from the proportions specified not only diminishes the efficacy of the solvents, but actually increases the deposit in the combustion zone.

The following tabulation of data indicates the nature of the results obtained by the use of combinations of solvents in the proportions previously indicated.

Table I

|  | Lauson engines, percent carbon removed | Percent gum removed |
|---|---|---|
| Toluol | 22 | 4 |
| Benzol | 22 | 6 |
| Cresol | 42 | 51 |
| Methyl naphthalene | 22 | 36 |
| Di butyl phthalate | 5 | 51 |
| Solvesso #1 | 18 | 0 |
| Solvesso #2 | 20 | 0 |
| 50 cresol<br>50 methyl naphthalene | 41 | 89 |
| 40 cresol<br>40 methyl naphthalene<br>20 di butyl phthalate | 19 | 90 |
| 50 toluol<br>35 cresol<br>15 methyl naphthalene | 51 | 22 |
| 15 toluol<br>50 cresol<br>35 methyl naphthalene | 54 | 98 |
| 50 benzol<br>20 cresol<br>20 methyl naphthalene<br>10 di butyl phthalate | 36 | 44 |
| 50 solvesso #1<br>20 cresol<br>20 methyl naphthalene<br>10 di butyl phthalate | 32 | 54 |

The figures appearing before the various compounds in the foregoing table indicate percent by volume.

All of the materials used in securing the data in Table I were commercial grade products. The cresol contained about 35% ortho, 40% meta and 25% para cresol, as well as small amounts of phenol and xylenols. The methyl naphthalene was a mixture of about 40% alpha and 60% beta methyl naphthalenes.

The data on carbon removal shown in Table I were obtained on one cylinder Lauson engines. These engines were equipped with removable piston crowns which made it quite easy to accurately weigh the amount of deposit accumulated thereon as a result of engine operation. The procedure followed in obtaining the carbon removal data in Table I was to operate the engines using a standard grade of commercial motor fuel until the deposition on the piston crown reached a predetermined amount, preferably between 2 and 3 grams. The piston crown with the carbon deposit thereon was carefully removed from the engine, weighed and replaced in the engine. The engine was started and operated until normal operating temperature was obtained, the engine stopped, the spark plug removed and one ounce of solvent directly sprayed into the combustion chamber through the spark plug hole by means of a pressure atomizer. The solvent was allowed to remain in contact with the deposit for fifteen minutes. At the end of this time the engine was started and operated until the exhaust gases were substantially devoid of smoke. The engine was then stopped, the piston crown again carefully removed and weighed. The loss in weight of carbon deposit divided by the total weight of deposit originally present, multiplied by 100, gave the percent carbon removal. All of the data on the Lauson engines are the averaged results of at least five runs.

The data on gum removal were obtained by the following method: Samples of gum obtained by exposure of cracked gasoline stocks to oxygen under elevated temperature and pressure were dissolved in acetone and sprayed on heated strips of shim stock. On striking the heated metal, the volatile solvent evaporated leaving a smooth varnish-like deposit. The amount of gum thus deposited, preferably about 1.5 to 2 grams, was maintained uniform for all tests and was determined by weighing the shim stock before and after the deposition. After coating with gum, the shim stock was inserted as a sleeve in a chamber, the temperature and pressure of which was controlled to simulate conditions in the intake manifold of standard internal combustion engines, namely, about 200° F. and a vacuum of approximately 16" of Hg and 1000 cc. of a 5% by volume solution of the solvent under test dissolved in a regular grade gasoline was supplied thereto in an atomized state through a standard Carter carburetor. The solvent was dissolved in gasoline in order to diminish the solvent power to a point where all of the gum on the shim stock would not be removed under the foregoing test conditions, thus permitting a better means of comparing the various solvents employed. The shim stock was weighed after the solvent treatment and the loss in weight of gum deposited divided by the amount of gum deposit originally present multiplied by 100, gave the percent gum removal.

In order to be classified as effective solvent compositions, the compositions must have a high efficacy for the removal of both carbon and gum deposits. A solvent which is very good in one respect but poor in the other is not considered satisfactory.

It will be noted from the data in Table I, that although cresol and commercial methyl naphthalene are individually fairly good carbon and gum removing agents, that the results obtained when using a solvent consisting of 50% by volume of cresol and 50% of commercial methyl naphthalene are unusually high for both carbon and gum deposit removal and are far greater than could have been anticipated on the basis of the results obtained when using the individual compounds alone. It will be further noted that the solvent compositions containing cresol, methyl naphthalene and toluol, produced still better results, which results are even more unusual when considered in view of the carbon and gum removing characteristics of the individual compounds used in this composition. It is apparent, therefore, that in each case there is a cooperative action between the various components of the compositions which action could in no way be foreseen from a knowledge of a behavior of the individual materials when used alone. Similarly, the compositions containing cresol, methyl, naphthalene and benzol or Solvesso #1, plus dibutyl phthalate show unusually effective merit for removing carbon and gum deposits, although these compositions are not as effective as those compositions in which no dibutyl phthalate is used. However, in view of the fact that the compositions containing the dibutyl phthalate do not give rise to dermatitis and since the compositions show substantial merit for removing carbon and gum deposits, such compositions as a whole are considered to be exceedingly valuable solvents for commercial use, especially where direct application of the solvent (i. e. not in solution in motor fuel) is contemplated.

Additional evidence of the unusually effective action of solvents in accordance with this invention was obtained using solvent #202, which was a combination of the following materials in the indicated proportions by volume:

| | Per cent |
|---|---|
| Benzol | 50 |
| Cresol | 20 |
| Commercial methyl naphthalene | 20 |
| Dibutyl phthalate | 10 |

This material was applied to a stock internal combustion engine which had been operated on a test block connected to a dynamometer using a standard regular grade gasoline as motor fuel until equilibrium operating conditions including equilibrium octane requirement prevailed. The octane requirement of the engine was determined as described in the last page of the article entitled "Engine deposits" by Joseph A. Moller and Harry L. Moir, appearing on pages 250 to 261, inclusive, of the June 1940 issue of the S. A. E. Journal. To obtain the octane requirement, the engine was gradually loaded and unloaded while using standard reference fuels as fuel for the engine. By varying the reference fuels, it was possible to determine the octane number of the fuel, which when supplied to the engine under the given operating conditions, would avoid knocking conditions. The octane number of this fuel is the octane requirement of the engine. By this means it was readily determined that new or newly cleaned engines gradually increased in octane requirement under conditions of normal operation with standard motor fuels. This is at least partially due to the accumulation of deposits in the combustion zone. After an engine has been operated for a sufficient period of time, there is relatively little further change in the octane requirement of the engine. The octane requirement of an engine which has reached this condition is designated as the "equilibrium octane requirement."

A stock six-cylinder engine mounted on a test block and connected to a dynamometer, as previously described, was operated on a standard commercial motor fuel until the octane requirement of the engine reached equilibrium. At this point the engine was stopped and solvent #202 applied in the manner described in the first paragraph on page 6. The octane requirement of the engine after application of the solvent was reduced 5.2 octane numbers. The operation of the engine on a standard motor fuel was resumed until the engine again reached an equilibrium octane requirement. The number of hours of operation required to reach this condition was 68. Similar tests were made on the same engine under exactly the same conditions and using the same amount of solvent that is now in wide commercial use. The reduction in octane requirement effected by this solvent was 2.1 octane numbers and the time required for the engine to reach an octane requirement equilibrium subsequent to the solvent application was 31 hours.

It will be seen from this data that solvent #202 was greatly superior not only in the extent of the reduction of the octane requirement effected by an application of the solvent, but in greatly extending the time of subsequent engine operation required to reach equilibrium octane requirement.

Although the use of our novel gum solvents has been more particularly described in connection with removal of gum and carbonaceous deposits from the intake and combustion zones of automotive engines, and in connection with motor fuels, it is to be understood that the solvents are useful as additives to motor oils and to lubricating oils in general where the problem of gum and carbon deposition is encountered. For example, when added in amounts ranging from 1% to 5% to motor oils, depositions of carbon on the piston rings are substantially minimized and removed. Likewise, gum deposition is substantially avoided when the solvents are used in the same proportions in industrial lubricating oils, as, for example, spindle oils. When used in connection with lubricating oils, the solvent does not require the addition of vehicles since the oil itself acts as a vehicle.

The foregoing general description of the invention and the specific examples described are sufficient to enable one skilled in the art to appreciate its value. The invention is not limited to the specific examples disclosed or to any particular theory of mechanism of the action of the gasoline additive but is to be interpreted as broadly as the prior art permits in view of the following claims.

We claim:

1. A composition for use in removing carbonaceous deposits from internal combustion engines comprising methyl naphthalene and cresol in the proportions of 30–50 percent by volume of methyl naphthalene and 70–50 percent by volume of cresol.

2. A composition in accordance with claim 1 in which the proportions of methyl naphthalene and cresol are approximately 50 percent by volume of the former and 50 percent by volume of the latter.

3. A composition for use in removing carbonaceous deposits from internal combustion engines comprising (1) methyl naphthalene, (2) cresol, and (3) a material boiling below 350° F. selected from the group consisting of benzene, alkyl benzenes and aromatic naphtha, in the approximate volume proportions of 15–35 percent of methyl naphthalene, 35–50 percent of cresol, and 15–50 percent of the group (3) material.

4. Composition in accordance with claim 3 containing 50 percent by volume of toluol, 35 percent by volume of cresol and 15 percent by volume of methyl naphthalene.

5. Composition in accordance with claim 3 containing 15 percent by volume of toluol, 50 percent by volume of cresol and 35 percent by volume of methyl naphthalene.

6. A composition for use in removing carbonaceous deposits from internal combustion engines comprising at least 10% by volume of a mixture consisting of approximately 30–50 percent by volume of methyl naphthalene and 70–50 percent by volume of cresol, the balance of said composition being a vehicle boiling from 350–850° F. having good penetrating and wetting characteristics with respect to said deposits and selected from the group consisting of refined mineral oils and pine oil.

7. A composition for use in removing carbonaceous deposits from internal combustion engines comprising at least 10% by volume of a mixture consisting of approximately (1) 15–35 percent parts by volume of methyl naphthalene, (2) 35–50 percent by volume of cresol, and (3) 15–50 percent by volume of a material boiling below 350° F. and selected from the group consisting of benzene, alkyl benzenes and aromatic naphthas, the balance of said composition being a vehicle boiling from 350–850° F. having good penetrating and wetting characteristics with respect to said deposits and selected from the group consisting of refined mineral oils and pine oil.

8. A liquid hydrocarbon motor fuel for internal combustion engines containing from .1 to 5% by volume of the composition defined by claim 6.

9. A liquid hydrocarbon motor fuel for internal combustion engines containing from .1 to 5% by volume of the composition defined by claim 7.

NORMAN D. WILLIAMS.
WILLIAM J. BACKOFF.